US011059477B2

(12) United States Patent
Fukushima et al.

(10) Patent No.: US 11,059,477 B2
(45) Date of Patent: Jul. 13, 2021

(54) PARKING ASSIST DEVICE FOR VEHICLE (71) Applicant: Hitachi Automotive Systems, Ltd., Hitachinaka (JP)

(72) Inventors: Yuuji Fukushima, Hitachinaka (JP); Taisetsu Tanimichi, Hitachinaka (JP); Masayuki Saruwatari, Hitachinaka (JP)

(73) Assignee: Hitachi Automotive Systems, Ltd., Hitachinaka (JP)

( * ) Notice: Subject to any disclaimer, the term of this patent is extended or adjusted under 35 U.S.C. 154(b) by 0 days.

(21) Appl. No.: 15/577,383

(22) PCT Filed: Jul. 11, 2016

(86) PCT No.: PCT/JP2016/070361
§ 371 (c)(1),
(2) Date: Nov. 28, 2017

(87) PCT Pub. No.: WO2017/022413
PCT Pub. Date: Feb. 9, 2017

(65) Prior Publication Data
US 2018/0170366 A1 Jun. 21, 2018

(30) Foreign Application Priority Data
Jul. 31, 2015 (JP) .............................. JP2015-151454

(51) Int. Cl.
*B60W 30/06* (2006.01)
*B60W 10/04* (2006.01)
(Continued)

(52) U.S. Cl.
CPC ............ *B60W 30/06* (2013.01); *B60R 21/00* (2013.01); *B60W 10/04* (2013.01); *B60W 10/06* (2013.01);
(Continued)

(58) Field of Classification Search
CPC .... B60W 30/06; B60W 10/184; B60W 10/06; B60W 50/14; B60W 30/146;
(Continued)

(56) References Cited

U.S. PATENT DOCUMENTS

2006/0052917 A1* 3/2006 Schwarzhaupt .......... B60T 7/12
701/31.4
2006/0287800 A1* 12/2006 Watanabe .......... B62D 15/0275
701/96

(Continued)

FOREIGN PATENT DOCUMENTS

CN 101616832 A 12/2009
DE 10 2004 001 555 A1 8/2005
(Continued)

OTHER PUBLICATIONS

International Search Report (PCT/ISA/210) issued in PCT Application No. PCT/JP2016/070361 dated Oct. 18, 2016 with English translation (Four (4) pages).

(Continued)

*Primary Examiner* — Donald J Wallace
(74) *Attorney, Agent, or Firm* — Crowell & Moring LLP (57) ABSTRACT

The purpose of the present invention is to provide a parking assist device for a vehicle such that the vehicle can be parked without decreasing or excessively increasing the speed or causing the vehicle to stop during assisted parking, the speed of the host vehicle is kept constant even immediately after an obstacle or a bump is cleared, and the vehicle is prevented from colliding with any other parked vehicle. The device calculates a speed command value and/or an engine torque command value in consideration of the acceleration/deceleration of the vehicle and controls the speed of the vehicle on the basis of the calculated speed command value and/or the engine torque command value, said acceleration/deceleration being predicted in advance on the basis of the height (Continued)

and distance of an obstacle and/or a bump that is present in a parking path, the gradient of the road surface, and the steering angle.

6 Claims, 6 Drawing Sheets

(51) Int. Cl.
| | |
|---|---|
| *B60W 10/18* | (2012.01) |
| *B62D 6/00* | (2006.01) |
| *B60R 21/00* | (2006.01) |
| *B60W 10/184* | (2012.01) |
| *B60W 10/06* | (2006.01) |
| *B60W 50/14* | (2020.01) |
| *B60W 30/14* | (2006.01) |
| *B60W 30/188* | (2012.01) |
| *B62D 15/02* | (2006.01) |

(52) U.S. Cl.
CPC .......... *B60W 10/18* (2013.01); *B60W 10/184* (2013.01); *B60W 30/146* (2013.01); *B60W 30/188* (2013.01); *B60W 50/14* (2013.01); *B62D 6/00* (2013.01); *B62D 15/0285* (2013.01); *B60T 2201/10* (2013.01); *B60W 2050/143* (2013.01); *B60W 2050/146* (2013.01); *B60W 2510/0642* (2013.01); *B60W 2540/18* (2013.01); *B60W 2552/15* (2020.02); *B60W 2552/35* (2020.02); *B60W 2554/00* (2020.02)

(58) Field of Classification Search
CPC .... B60W 30/188; B60W 10/04; B60W 10/18; B62D 6/00; B62D 15/0285; B60R 21/00; B60T 2201/10
See application file for complete search history.

(56) References Cited

U.S. PATENT DOCUMENTS

| | | | |
|---|---|---|---|
| 2007/0027598 A1* | 2/2007 | Mori | B60W 10/06 701/41 |
| 2009/0048748 A1* | 2/2009 | Zhao | B60W 40/105 701/59 |
| 2010/0049413 A1 | 2/2010 | Makino et al. | |
| 2011/0156928 A1* | 6/2011 | Ghisio | B62D 15/028 340/932.2 |
| 2013/0046441 A1* | 2/2013 | Marczok | G05D 1/0212 701/41 |
| 2016/0068187 A1* | 3/2016 | Hata | B62D 15/0285 701/41 |
| 2017/0259850 A1* | 9/2017 | Yamashita | B62D 6/00 |

FOREIGN PATENT DOCUMENTS

| | | |
|---|---|---|
| EP | 2 113 436 A1 | 11/2009 |
| EP | 2 327 574 A1 | 6/2011 |
| JP | 2008-201270 A | 9/2008 |
| JP | 2010-76675 A | 4/2010 |
| JP | 2010-230139 A | 10/2010 |
| JP | 2013-49389 A | 3/2013 |
| JP | 2013-75619 A | 4/2013 |
| WO | WO 2012/095716 A1 | 7/2012 |

OTHER PUBLICATIONS

Japanese-language Written Opinion PCT/ISA/237) issued in PCT Application No. PCT/JP2016/070361 dated Oct. 18, 2016 (Five (5) pages).
Extended European Search Report issued in counterpart European Application No. 16832692.4 dated Feb. 13, 2019 (seven (7) pages).
Chinese-language Office Action issued in counterpart Chinese Application No. 201680028394.9 dated Jun. 28, 2019 with English translation (18 pages).

* cited by examiner

PARKING ASSIST DEVICE FOR VEHICLE

TECHNICAL FIELD

The present invention relates to a parking assist device for a vehicle.

BACKGROUND ART

Various manufacturers have developed parking assist devices that can automatically move a vehicle to a parking position without a steering operation, an accelerator operation, and a brake operation performed by a driver. Among the parking assist devices, a parking assist device for a vehicle has been known which calculates an optimum path to the parking position, calculates a steering angle for maintaining the optimum path, and performs assisted parking so as to maintain vehicle speed even when there is deceleration caused by the steering angle or deceleration caused by a gradient or a step (for example, see PTL 1).

CITATION LIST

Patent Literature

PTL 1: JP 2010-076675 A

SUMMARY OF INVENTION

Technical Problem

With the technique disclosed in PTL 1, however, the own vehicle speed of the vehicle during assisted parking, which has been decelerated due to the steering angle, the obstacle, and the gradient, is measured, and the assisted parking is performed by calculating and correcting a driving force when the vehicle speed is equal to or lower than predetermined speed.

In this case, the driving force is calculated on the basis of a difference between the predetermined speed and the own measured vehicle speed or a change rate of the own vehicle speed, and the own vehicle speed is controlled by reducing the difference from the own vehicle speed or reducing the change rate of the own vehicle speed depending on a change of the driving force, whereby the predetermined speed can be maintained.

However, the own vehicle speed does not change and remains at zero even if the driving force is changed when there is an obstacle in a parking path and a host vehicle stops, and thus, it is difficult to maintain the own vehicle speed of the vehicle. It is possible to overcome the obstacle by extremely slowly raising the driving force even if the own vehicle speed is not known, but it takes some time until the vehicle is parked at a target position or it is difficult to complete the parking.

In addition, when a strong driving force is applied to overcome the obstacle, there is a possibility that the vehicle may overcome the obstacle vigorously so that there is a risk of colliding with any other parked vehicle or the like.

Solution to Problem

In order to solve the above-described problems, a parking assist device for a vehicle of the present invention, for example, calculates a speed command value or/and an engine torque amount command value, obtained by predicting acceleration or deceleration of the vehicle, in advance, on the basis of each height of an obstacle and a step inside a parking path, each distance to the obstacle and step, a gradient of a road surface condition, and a steering angle, and controls speed of the vehicle on the basis of the calculated speed command value or/and engine torque amount command value.

Advantageous Effects of Invention

According to the present invention, it is possible to provide the parking assist device for a vehicle that is capable of parking without decreasing or excessively increasing the speed or causing the vehicle to stop during assisted parking and does not collide with any other parked vehicle or the like by maintaining the own vehicle speed of the vehicle to be constant even immediately after overcoming an obstacle and a step.

DESCRIPTION OF EMBODIMENTS

Hereinafter, examples of the present invention will be described with reference to the drawings.

First Example

A parking assist device for a vehicle according to a first embodiment of the present invention will be described with reference to the drawings.

Figure 1:
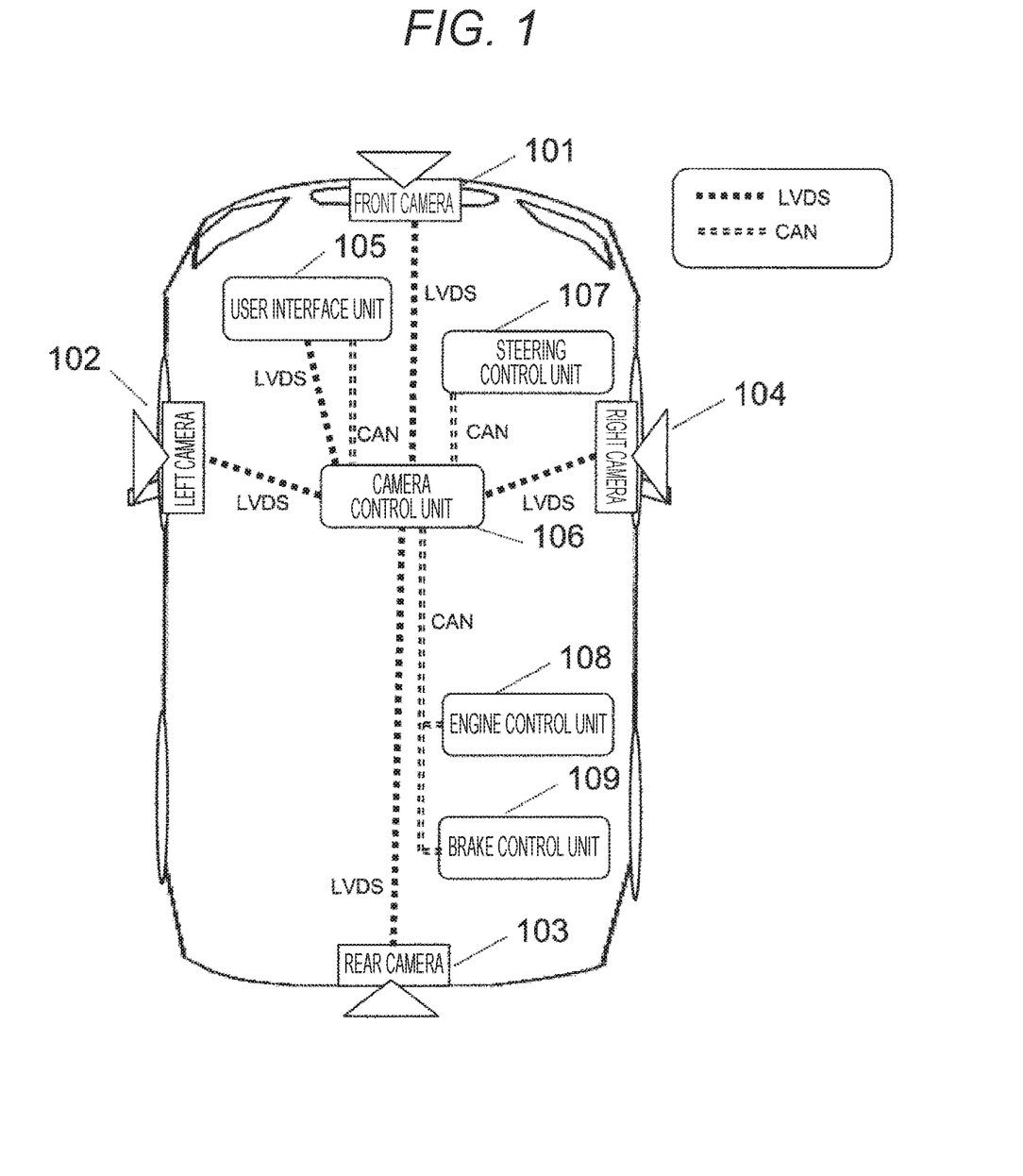
FIG. 1 is an ECU configuration diagram of a parking assist device for a vehicle according to a first embodiment of the present invention.

FIG. 1 is an ECU configuration diagram of the parking assist device for a vehicle according to the embodiment of the present invention. In FIG. 1, a camera control unit 107 is connected to a front camera 101, a left camera 102, a rear camera 103, a right camera 104, and a user interface unit 105 via an LVDS. In addition, the camera control unit 107 is connected to the user interface unit 105, a steering control unit 106, an engine control unit 108, and a brake control unit 109 via a CAN.

The front camera 101 is, for example, a camera that images a front side of a vehicle. The left camera 102 is, for example, a camera that images a left side of the vehicle. The rear camera 103 is, for example, a camera that images a rear side of the vehicle. The right camera 104 is, for example, a camera that images a right side of the vehicle.

The user interface unit 105 is, for example, an on-board display equipped with a touch panel that combines a parking position and a parking path calculated by the camera control unit 106 with images captured by the front camera 101, the left camera 102, the rear camera 103, and the right camera 104, and presents the combined images to a driver and receives a parking assistance start instruction from the driver.

Incidentally, the user interface unit 105 receives the image combined by the camera control unit 106 via the LVDS and displays the image, and notifies the camera control unit 106 of the parking assistance start instruction from the driver via the CAN.

The camera control unit 106 is a camera control unit that includes a parking frame recognition unit, a parking frame path calculation unit, a road surface shape recognition unit, an obstacle recognition unit, a steering angle command value calculation unit, a steering/torque command value calculation unit, a steering/torque command value addition unit, and an idling stop determination unit.

Incidentally, the camera control unit 106 calculates a steering angle command value and transmits the steering angle command value to the steering control unit, and calculates a speed command value or/and an engine torque amount command value and transmits the speed command value or/and engine torque amount command value to the engine control unit and brake control unit via the CAN in order to control the parking assist device for a vehicle.

The steering control unit 107 controls steering using the steering angle command value calculated by the camera control unit 106 and performs automatic steering during assisted parking.

The engine control unit 108 controls the engine using the speed command value or/and the engine torque amount command value calculated by the camera control unit 106, and controls vehicle speed during assisted parking.

The brake control unit 109 controls brake using the speed command value or/and engine torque amount command value calculated by the camera control unit 106, and controls the brake during assisted parking.

Figure 2:
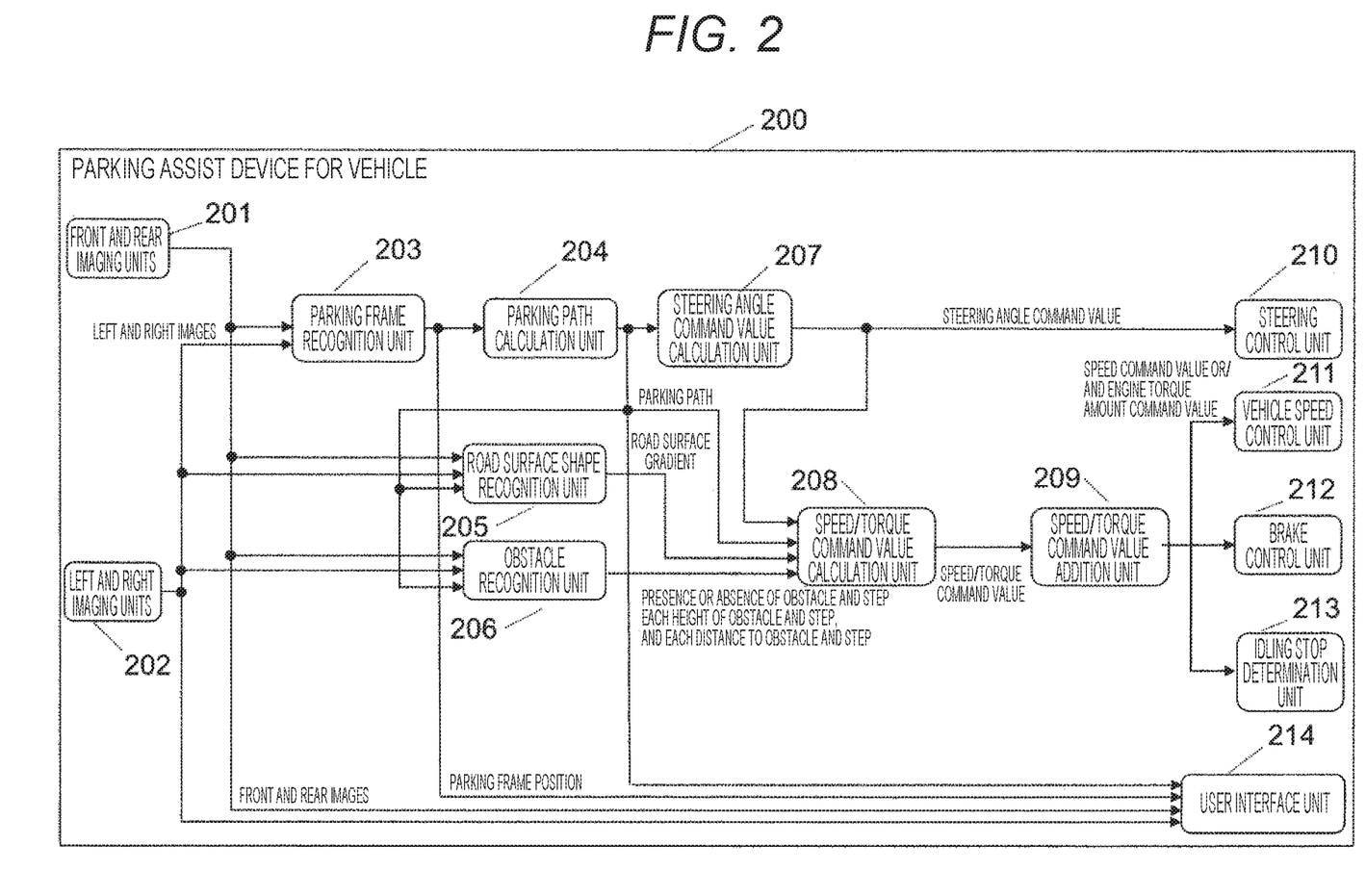
FIG. 2 is a control block diagram illustrating an operation of the parking assist device for a vehicle according to the first embodiment of the present invention.

Hereinafter, an operation of a parking assist device 200 for a vehicle according to the first embodiment of the present invention will be described with reference to a block diagram of FIG. 2. In FIG. 2, the parking assist device 200 for a vehicle includes front and rear imaging units 201, left and right imaging units 202, a parking frame recognition unit 203, a parking path calculation unit 204, a road surface shape recognition unit 205, an obstacle recognition unit 206, a steering angle command value calculation unit 207, a speed/torque command value calculation unit 208, a speed/torque command value addition unit 209, a steering control unit 210, a vehicle speed control unit 211, a brake control unit 212, an idling stop control unit 213, and a user interface unit 214. A feature of the present invention is the parking assist device for a vehicle that includes the speed/torque command value calculation unit 208, the speed/torque command value addition unit 209, the road surface shape recognition unit 205, and the obstacle recognition unit 206.

The front and rear imaging units 201 are the front camera 101 and the rear camera 103 that image the front and rear sides of the vehicle. The left and right imaging units 202 are the left camera 102 and the right camera 104 that image the left and right sides of the vehicle.

The parking frame recognition unit 203 is a block in the camera control unit 106 and recognizes a parking frame position by analyzing front, rear, left and right images captured by the front and rear imaging units 201 and the left and right imaging units 202.

The parking path calculation unit 204 is a block in the camera control unit 106 and calculates a parking path to a parking position on the basis of a distance and a direction from a current vehicle stop position to the parking position recognized by the parking frame recognition unit 203.

Figure 3:
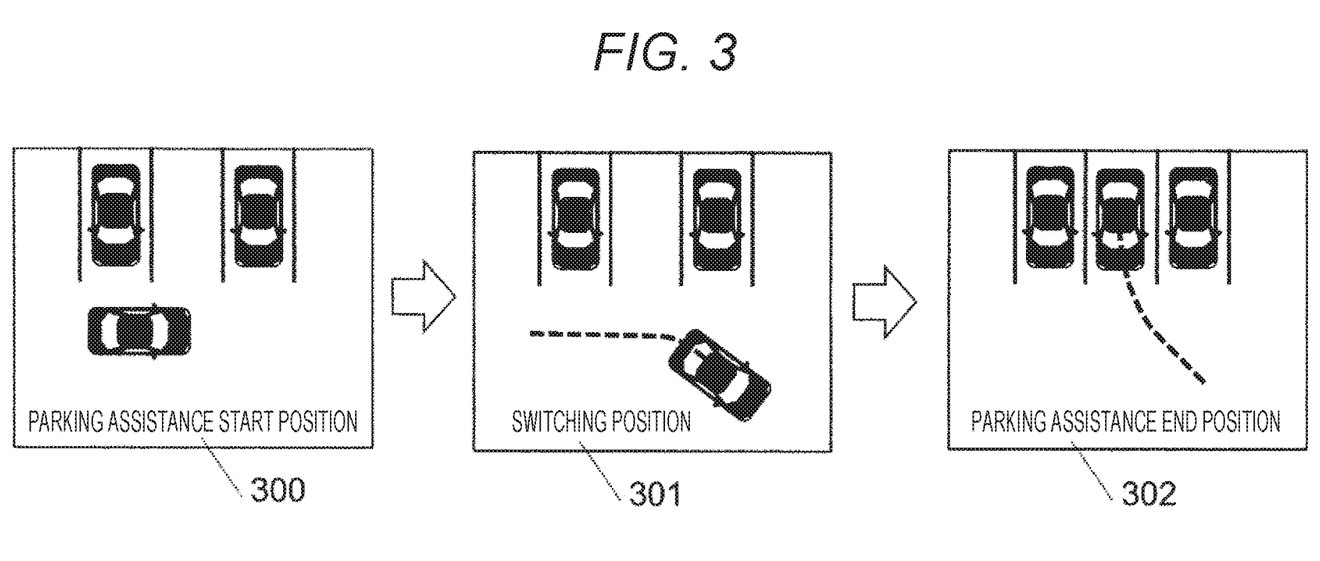
FIG. 3 is a schematic view illustrating a parking state.

FIG. 3 illustrates the parking path to be calculated. The parking path is calculated from 300 that is a parking assistance start position, via 301 with a switching position, to 302 that is a parking assistance end position.

The road surface shape recognition unit 205 is a block in the camera control unit 106 and detects a gradient of a road surface condition in a parking lot. The gradient of the road surface condition may be detected by using an acceleration sensor, or the gradient of the road surface condition may be detected by image analysis of the images captured by the front and rear imaging units 201 and the left and right imaging units 202.

The obstacle recognition unit 206 is a block in the camera control unit 106 and detects whether there is an obstacle and a step in the parking path calculated by the parking path calculation unit 204. When the obstacle and step are detected, each height of the obstacle and step and each distance to the obstacle and step are calculated by image analysis of the images captured by the front and rear imaging units 201 and the left and right imaging units 202. In addition, the height of a wheel stopper that is in a coin-operated parking lot is stipulated, and thus, height data of obstacles held in advance may be used when the wheel stopper of the coin-operated parking lot is detected or when the coin-operated parking lot is known on the basis of map data.

The steering angle command value calculation unit 207 is a block in the camera control unit 106 and calculates a steering angle command value, in advance, on the basis of the parking path calculated by the parking path calculation unit 204.

The speed/torque command value calculation unit 208 is a block in the camera control unit 106 and calculates a speed command value or/and an engine torque amount command value, obtained by predicting acceleration or deceleration of the vehicle in advance, preliminarily before starting assisted parking on the basis of presence or absence of the obstacle and step, each height of the obstacle and step, and each distance to the obstacle and step detected by the obstacle recognition unit 206, the gradient of the road surface condition in the parking lot detected by the road surface shape recognition unit 205, the steering angle command value calculated by the steering angle command value calculation unit 207, and the parking path calculated by the parking path calculation unit 204.

When the obstacle is detected, the speed command value or/and engine torque amount command value to be calculated are set to be high as compared to a case where no obstacle is detected.

In addition, the speed command value or/and engine torque amount command value are set on the basis of a gradient of the road surface shape. For example, the speed command value or/and engine torque amount command value are set to be high when the road surface shape of the parking lot is an uphill road, the speed command value or/and engine torque amount command value are set to be low when the road surface shape of the parking lot is a downhill road, or parking is performed in an idling stop state when the idling stop determination unit 213 determines that it is possible to move to a target position even in an engine stop state.

Incidentally, when the weight of the vehicle is m [kg], the height of the obstacle is h [m], the gravity acceleration is g [m/s$^2$], and the time is t [s], a speed command value v [m/s]

and an engine torque amount command value F [N] to be calculated are calculated on the basis of the following calculation formulas.

$$v[m/s]=(2*g*h)^{1/2} \quad \text{(Formula 1.1)}$$

$$F[N]=m*(2*g*h)^{1/2}/\Delta t \quad \text{(Formula 1.2)}$$

The speed/torque command value addition unit 209 is a block in the camera control unit 106 and adds the speed command value or/and the engine torque amount command value calculated by the speed/torque command value calculation unit 208.

The steering control unit 210 is a block in the steering control unit 107, and controls steering using the steering angle calculated in advance by the steering angle command value calculation unit 207, thereby performing automatic steering according to the parking path.

The vehicle speed control unit 211 is a block in the engine control unit 108, and controls vehicle speed on the basis of the speed command value or/and engine torque amount command value calculated in advance by the speed/torque amount command value addition unit 209, thereby automatically controlling vehicle speed according to the parking path.

The brake control unit 212 is a block in the brake control unit 109, and controls brake on the basis of the speed command value or/and the engine torque amount command value calculated in advance by the speed/torque amount command value addition unit 209, thereby controlling brake according to the parking path.

The idling stop determination unit 213 is a block in the camera control unit 106 and determines whether the idling stop is possible on the basis of the speed command value or/and the engine torque amount command value calculated in advance by the speed/torque amount command value addition unit 209.

The user interface unit 214 is, for example, an on-board display equipped with a touch panel that combines the parking position recognized by the parking frame recognition unit 203 and the parking path calculated by the parking path calculation unit 204 with the images captured by the front and rear imaging units 201 and the left and right imaging units 202, presents the combined images to the driver, and receives a parking assistance start instruction from the driver.

Figure 4:
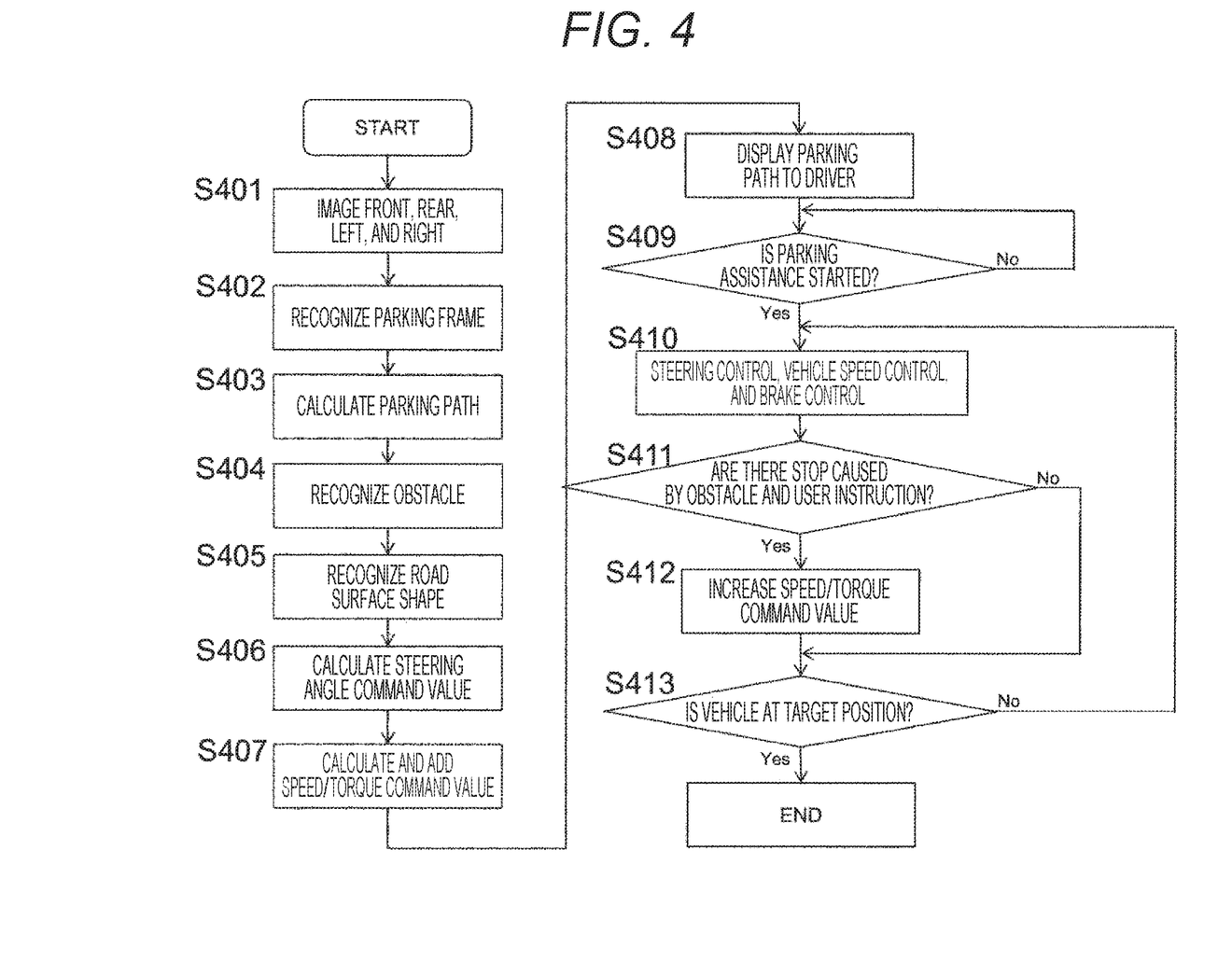
FIG. 4 is a flowchart illustrating the operation of the parking assist device for a vehicle according to the first embodiment of the present invention.

Hereinafter, the operation of the parking assist device 200 for a vehicle according to the first embodiment of the present invention will be described according to a flowchart of FIG. 4.

First, when the driver activates the parking assist device 200 in order to start the assisted parking, the front and rear imaging units 201 and the left and right imaging units 202 image the front, rear, left, and right sides of the vehicle (step S401).

Next, the parking frame recognition unit 203 recognizes the parking frame by analyzing front, rear, left and right images captured by the front and rear imaging units 201 and the left and right imaging units 202 (step S402).

Next, the parking path calculation unit 204 calculates the parking path to the parking position on the basis of the distance and direction from the current vehicle stop position to the parking position recognized by the parking position recognition unit 203 (step S403).

Next, the obstacle recognition unit 206 recognizes whether an obstacle and a step are present or absent in the parking path calculated by the parking path calculation unit 204, and calculates each height of the obstacle and step and each distance to the obstacle and step in the case of presence. (step S404).

Next, the road surface shape recognition unit 205 detects the gradient of the road surface condition in the parking lot (step S405).

Next, the steering angle command value calculation unit 207 calculates the steering angle command value in advance on the basis of the parking path calculated by the parking path calculation unit 204 (step S406).

Next, the speed/torque command value calculation unit 208 calculates a speed command value or/and an engine torque amount command value, obtained by predicting acceleration or deceleration of the vehicle in advance, preliminarily before starting assisted parking on the basis of presence or absence of the obstacle and step, each height of the obstacle and step, and each distance to the obstacle and step detected by the obstacle recognition unit 206, the gradient of the road surface condition in the parking lot detected by the road surface shape recognition unit 205, the steering angle command value calculated by the steering angle command value calculation unit 207, and the parking path calculated by the parking path calculation unit 204. After that, the speed/torque command value addition unit 209 adds the speed command value or/and engine torque amount command value calculated by the speed/torque command value calculation unit 208 (step S407).

Next, the user interface unit 214 combines the parking position recognized by the parking frame recognition unit 203 and the parking path calculated by the parking path calculation unit 204 with the images captured by the front and rear imaging units 201 and the left and right imaging units 202, and presents the combined images to the driver (step S408).

Next, upon receiving the parking assistance start instruction from the driver, the user interface unit 214 instructs the parking assist device for a vehicle to start controlling steering and vehicle speed (step S409).

Next, the steering control unit 210, the vehicle speed control unit 211, and the brake control unit 212 control steering using the steering angle calculated in advance by the steering angle command value calculation unit 107, and control vehicle speed and brake on the basis of the speed command value or/and engine torque amount command value calculated in advance by the speed/torque amount command value calculation unit 108 (step S410).

Next, when the vehicle has stopped during the assisted parking due to the step or the like that the vehicle hardly overcomes, the vehicle speed control unit 211 notifies the user interface unit 214 that the vehicle has stopped and the user interface unit 214 displays this notification to the driver. Then, the user interface unit 214 waits for the parking assistance start instruction from the driver, and confirms an intention of the driver regarding whether to overcome the step or the like (step S411).

Next, upon receiving the parking assistance start instruction from the user interface unit 214, the vehicle speed control unit 211 increases the speed command value or/and engine torque amount (step S412).

Next, the host vehicle is moved to the target position and the vehicle is stopped (step S413).

Hereinafter, a parking state according to the first embodiment of the present invention will be described with reference to a schematic view of FIG. 3.

The vehicle advances from the parking assistance start position 300 to the switching position 301, and is reversed to the parking assistance end position 302, and then, the assisted parking is ended.

Steps S401 to S409 are sequentially executed at the parking assistance start position 300, the assisted parking is started after setting the switching position 301 as the target position, and steps S410 to S412 are repeatedly executed to cause the vehicle to advance to the switching position 301. Next, steps S401 to S408 are sequentially executed at the switching position 301, the parking assistance end position 302 is set as the target position, then, steps S410 to S412 are repeatedly executed to cause the vehicle to be reversed to the parking assistance end position 302, and the assisted parking is ended.

Figure 5:
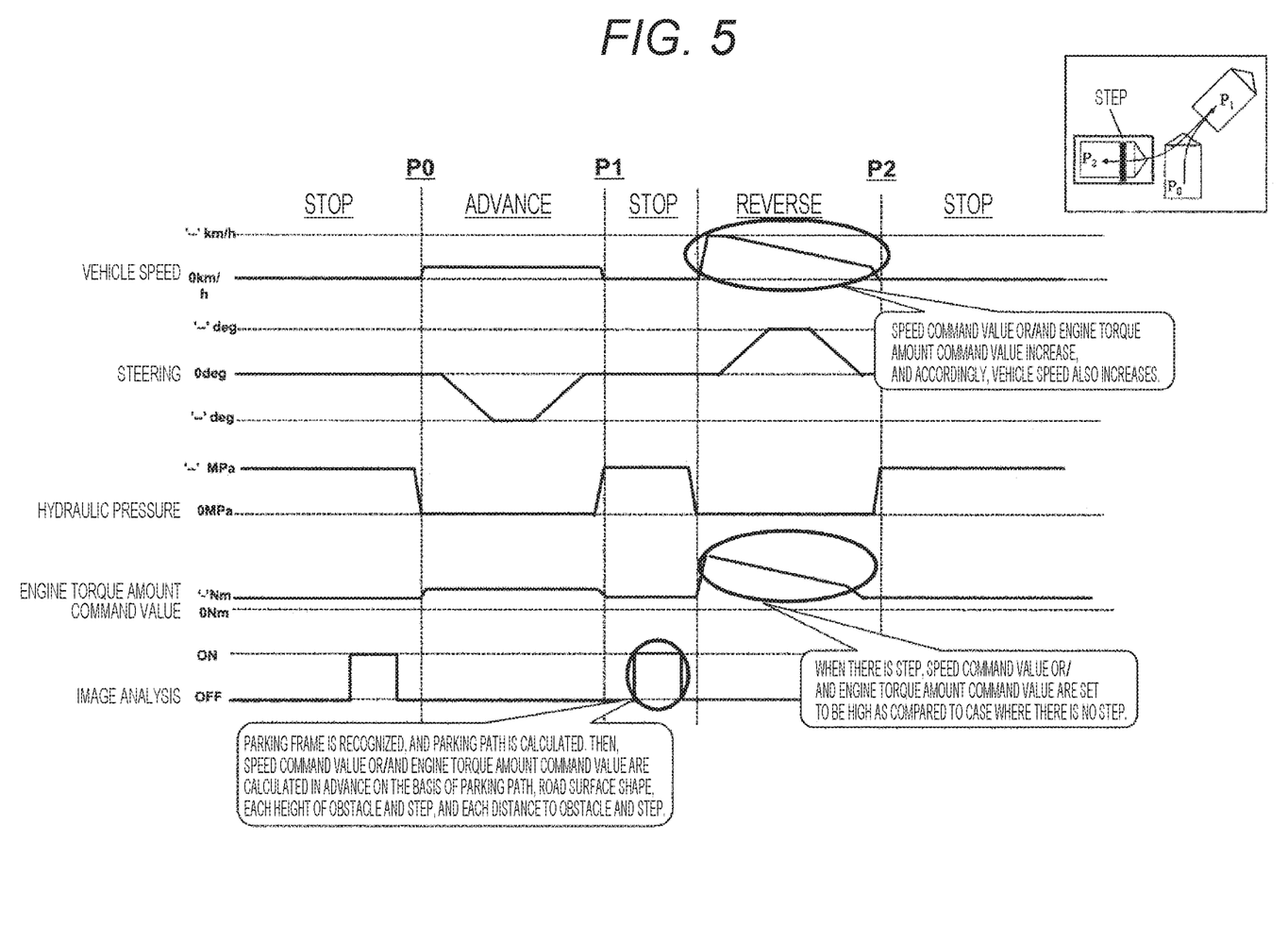
FIG. 5 is a timing chart diagram in a case where there is a step according to the first embodiment of the present invention.

Hereinafter, a timing chart in a case where there is a step according to the first embodiment of the present invention will be described with reference to FIG. 5. P0 is a parking assistance start position, P1 is a switching position, and P2 is a parking assistance end position. In addition, it is assumed that there is a step between P1 and P2 in this timing chart.

The parking frame is recognized and the parking path is calculated at a point in time of P1 at which the vehicle is stopped. Then, the speed command value or/and engine torque amount command value are calculated in advance on the basis of the parking path, the road surface shape, each height of the obstacle and step, and each distance to the obstacle and step. Meanwhile, there is the step in this case, and thus, the vehicle speed is controlled by setting the speed command value or/and engine torque amount command value to be high as compared to a case where there is no step. In addition, since the speed command value or/and engine torque amount command value are set to be high, the vehicle speed during the assisted parking also increases.

As described above, the speed command value or/and engine torque amount command value, obtained by predicting the acceleration or deceleration of the vehicle in advance on the basis of each height of the obstacle and step in the parking path, each distance to the obstacle and step, the gradient of the road surface condition, and the steering angle are calculated according to the above-described configuration. Then, it is possible to provide the parking assist device for a vehicle that controls the vehicle speed on the basis of the calculated speed command value or/and engine torque amount command value without decreasing or excessively increasing the speed or causing the vehicle to stop during assisted parking.

Second Example

Hereinafter, a parking assist device for a vehicle according to a second embodiment of the present invention will be described with reference to the drawings.

Figure 6:
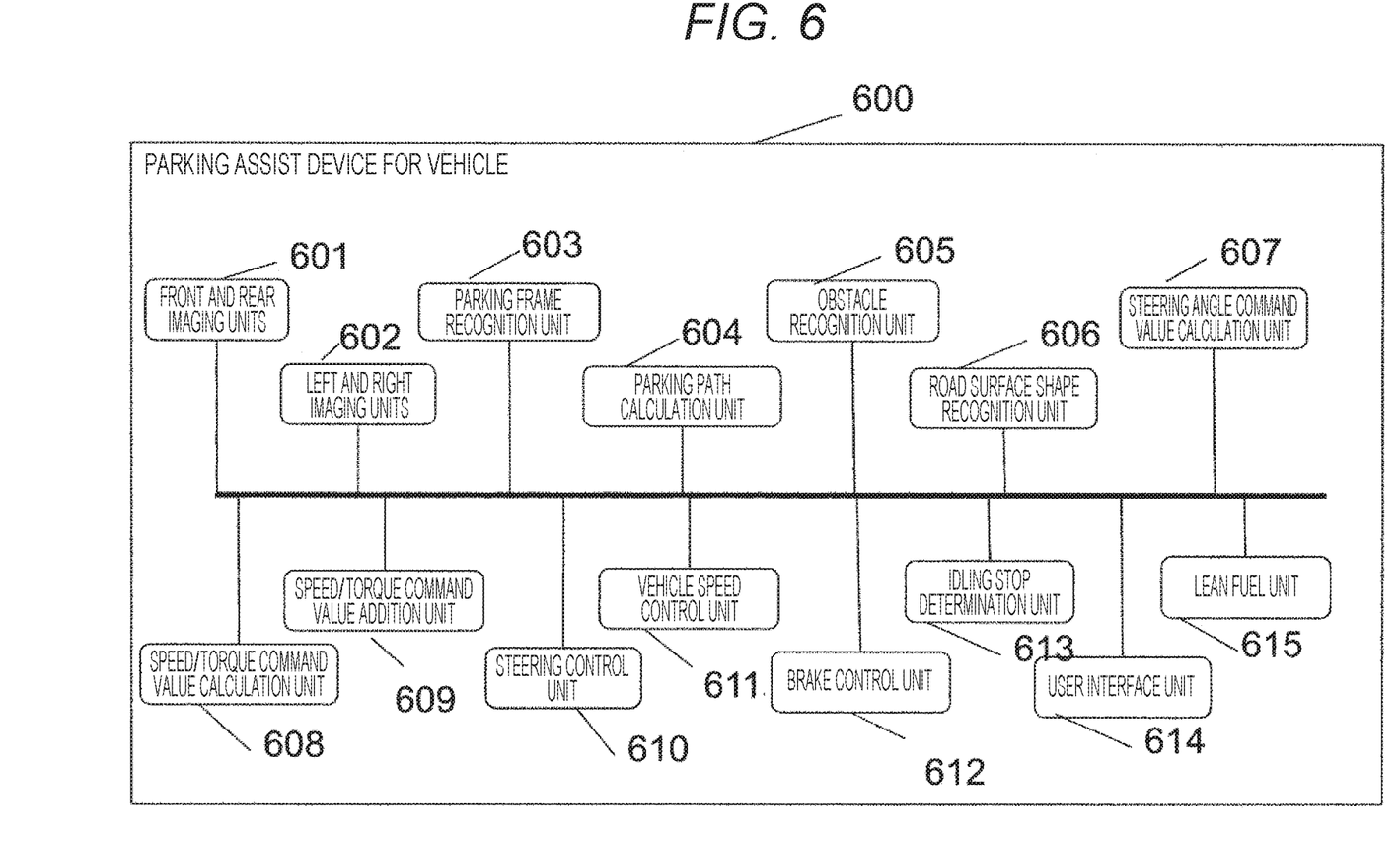
FIG. 6 is a block diagram illustrating an overall configuration of a parking assist device for a vehicle according to a second embodiment of the invention.

FIG. 6 is a block diagram illustrating the overall configuration of the parking assist device 200 for a vehicle according to the embodiment of the present invention. A different configuration from the first embodiment is that a lean fuel control unit 614 is further provided. The same content as that of the first embodiment will not be described.

The lean fuel 614 controls implementation of a lean fuel (lean burn).

The assisted parking in the second example is performed such that the own vehicle speed of the vehicle is controlled while applying a brake by a brake control unit 612 to make the own vehicle speed of the vehicle constant using a speed command value or/and an engine torque amount command value obtained by adding a certain amount to a speed command value or/and an engine torque amount command value calculated by a speed/torque command value calculation unit 608 in order to overcome an obstacle and a step. Then, the brake is controlled by the brake control unit 612 such that the vehicle speed is constant even immediately after overcoming the obstacle and step using each distance to the obstacle and step detected by an obstacle recognition unit 605 and a movement distance of the vehicle during the assisted parking.

In addition, fuel consumption deteriorates since the speed command value or/and engine torque amount command value added with the certain amount are used during the assisted parking. Thus, it is preferable to use the lean fuel (lean burn) by the lean fuel unit 614 during assisted parking.

As described above, it is possible to provide the parking assist device for a vehicle that maintains the own vehicle speed of the vehicle to be constant even immediately after overcoming the obstacle and step and does not collide with any other parked vehicle or the like according to the above-described configuration.

In addition, it is possible to maintain the fuel consumption by using the lean fuel during the assisted parking although the fuel consumption would normally deteriorate since the speed command value or/and engine torque amount command value added with the certain amount are used during the assisted parking.

REFERENCE SIGNS LIST 101 front camera
102 left camera
103 right camera
104 rear camera
105 user interface unit
106 camera control unit
107 steering control unit
108 engine control unit
109 brake control unit
200 parking assist device for vehicle
201 front and rear imaging units
202 left and right imaging units
203 parking frame recognition unit
204 parking path calculation unit
205 road surface shape recognition unit
206 obstacle recognition unit
207 steering angle command value calculation unit
208 speed/torque command value calculation unit
209 speed/torque command value addition unit
210 steering control unit
211 vehicle speed control unit
212 brake control unit
213 idling stop determination unit
214 user interface unit
600 parking assist device for vehicle
601 front and rear imaging units
602 left and right imaging units
603 parking frame recognition unit
604 parking path calculation unit
605 road surface shape recognition unit
606 obstacle recognition unit
607 steering angle command value calculation unit
608 speed/torque command value calculation unit
609 speed/torque command value addition unit
610 steering control unit
611 vehicle speed control unit
612 brake control unit 613 idling stop determination unit
614 user interface unit
615 lean fuel unit

The invention claimed is:

1. A parking assist device for a vehicle, comprising:
a user interface;
a speed/torque command value calculation unit configured to calculate a speed command value and an engine torque command value;
a speed/torque command value addition unit;
an obstacle recognition unit; and
a road surface shape recognition unit, wherein
the speed command value and the engine torque command value are calculated by predicting acceleration and deceleration of the vehicle in advance based on each of: i) a height of an obstacle, ii) a step inside a parking path, iii) a distance to the obstacle, iv) a distance to the step, v) a gradient of a road surface condition, and vi) a steering angle,
the road surface shape recognition unit controls speed of the vehicle based on the calculated speed command value and the engine torque command value,
the user interface combines parking positions calculated by two different parking path calculation units with images captured by four different imaging units of the vehicle to thereby generate a combined image that is displayed to a user, and
the user interface unit is configured to await to receive parking assistance start instruction from the user, and to confirm an intention of the user regarding whether to overcome the obstacle.

2. The parking assist device for a vehicle according to claim 1, wherein
when an obstacle is detected by an obstacle recognition unit, the speed command value and the engine torque command value to be calculated are set to be high as compared with a case where no obstacle is detected.

3. The parking assist device for a vehicle according to claim 1, wherein
the speed command value and the engine torque command value to be calculated are set to be high or low depending on the steering angle and a gradient of a road surface shape in a parking lot.

4. The parking assist device for a vehicle according to claim 1, capable of making own vehicle speed of the vehicle constant even immediately after overcoming an obstacle and a step while outputting a speed command value and the engine torque command value added with a certain amount to overcome the obstacle and step and applying a brake so as to set constant vehicle speed.

5. The parking assist device for a vehicle according to claim 1, wherein
control is performed such that the vehicle moves to a parking frame in an idling stop state when it is determined that the vehicle is movable to a target position even in an engine stop state.

6. The parking assist device for a vehicle according to claim 1, comprising
means for asking a driver about an intention as to whether to overcome an obstacle when the vehicle stops against the obstacle during assisted parking.

* * * * *